United States Patent
Han et al.

(10) Patent No.: US 11,860,259 B2
(45) Date of Patent: Jan. 2, 2024

(54) OPTICAL-ELECTRONIC INTEGRATED RF LEAKAGE INTERFERENCE CANCELLATION SYSTEM AND METHOD FOR CW RADAR

(71) Applicant: DALIAN UNIVERSITY OF TECHNOLOGY, Liaoning (CN)

(72) Inventors: Xiuyou Han, Liaoning (CN); Shuanglin Fu, Liaoning (CN); Xinxin Su, Liaoning (CN); Zhenlin Wu, Liaoning (CN); Yiying Gu, Liaoning (CN); Mingshan Zhao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 599 days.

(21) Appl. No.: 17/259,476

(22) PCT Filed: May 29, 2020

(86) PCT No.: PCT/CN2020/093097
§ 371 (c)(1),
(2) Date: Jan. 11, 2021

(87) PCT Pub. No.: WO2021/184548
PCT Pub. Date: Sep. 23, 2021

(65) Prior Publication Data
US 2022/0026520 A1    Jan. 27, 2022

(30) Foreign Application Priority Data
Mar. 20, 2020    (CN) .......................... 202010198476.6

(51) Int. Cl.
*G01S 7/02* (2006.01)
*H04B 1/525* (2015.01)
(Continued)

(52) U.S. Cl.
CPC .............. *G01S 7/023* (2013.01); *H04B 1/525* (2013.01); *H04B 1/109* (2013.01); *H04B 10/25752* (2013.01); *H04B 2210/006* (2013.01)

(58) Field of Classification Search
CPC ......... G01S 7/023; H04B 1/525; H04B 1/109; H04B 10/25752; H04B 2210/006
(Continued)

(56) References Cited

U.S. PATENT DOCUMENTS
5,710,651 A    1/1998    Logan, Jr.

FOREIGN PATENT DOCUMENTS
| CN | 102636694 A | 8/2012 |
|---|---|---|
| CN | 102636694 B | 3/2014 |

(Continued)

*Primary Examiner* — William Choi
(74) *Attorney, Agent, or Firm* — Muncy, Geissler, Olds & Lowe, P.C.

(57) ABSTRACT

An optical-electronic integrated RF leakage interference cancellation system and method for continuous wave radars belongs to the technical filed of radars. The optical-electronic integrated RF leakage interference cancellation system cancels the RF leakage interference by integrating of the microwave photonic link and the cable link. The microwave photonic link implements the phase adjustment, time delay adjustment and amplitude adjustment of the microwave signal tapped from the continuous wave source in the transmitter and realizes the cancellation matching conditions of the out of phase, the matching delay time and the same amplitude with the leakage interference signal. It has the advantages of broad frequency band, large bandwidth, and high tuning resolution, which enables the effective suppression of the RF leakage interference and ensures the high transmit-to-receive isolation for continuous wave radars.

3 Claims, 3 Drawing Sheets

(51) Int. Cl.
*H04B 1/10* (2006.01)
*H04B 10/2575* (2013.01)

(58) Field of Classification Search
USPC .......................................................... 359/237
See application file for complete search history.

(56) References Cited

FOREIGN PATENT DOCUMENTS

| | | |
|---|---|---|
| CN | 107682087 A | 2/2018 |
| CN | 107947866 A | 4/2018 |
| CN | 108919244 A | 11/2018 |
| CN | 110380788 A | 10/2019 |

OPTICAL-ELECTRONIC INTEGRATED RF LEAKAGE INTERFERENCE CANCELLATION SYSTEM AND METHOD FOR CW RADAR

TECHNICAL FIELD

The present invention relates to the technical field of radar, and especially relates to an optical-electronic integrated radio frequency (RF) leakage interference cancellation system and method for continuous wave (CW) radar.

BACKGROUND

The CW radars transmit and receive signals by using the single frequency, multiple frequencies or frequency modulated continuous wave. Compared with the pulse radars, CW radars have the advantages of lower power consumption, low interception, low slow and small target detection, high distance resolution, etc, and have great potential in the fields of autopilot, aircraft landing, Doppler navigation, velocity measurement and advanced measurement. The continuous wave working mode makes the high-power transmission signal of the radar transmitter leak to the receiver and cause serious interference, which is called as RF leakage interference. The high power leakage interference can saturate or even destroy the receiver's amplifier, causing the system to not work. Therefore, effective measures must be taken to suppress the RF leakage interference to ensure the high transmit-to-receive (T/R) isolation of CW radar.

The system with dual antennas for separate transmission and reception isolate the RF leakage interference in space, but it needs to occupy a larger space, which may be difficult to meet the application requirements of small platforms such as space load and mobile platform. The system with single antenna shared by the transceiver uses the electrical circulator to isolate the RF leakage interference, which has the advantages of compact structure and small size. But usually the electric circulator can only provide 25-30 dB isolation, which cannot meet the T/R isolation requirement of actual applications. The RF active cancellation technique is an effective method by tapping a reference branch from the transmitter to construct a cancellation signal with the same amplitude and out of phase relationship with the leakage signal, and to suppress the leakage interference. However, in the application of high-performance CW radars for longer detection distance and higher resolution, the traditional electrical RF active cancellation method is limited by the narrow RF operation bandwidth of the electronic devices and the low accuracy of amplitude and phase control, and cannot effectively suppress the RF leakage interference in a large bandwidth, which is difficult to meet the high T/R isolation requirements of CW radars.

SUMMARY

The invention provides an optical-electronic integrated RF leakage interference cancellation system and method for CW radars, which effectively overcome the limitations of RF active cancellation technique in the prior arts, such as narrow operation bandwidth, low accuracy of amplitude and phase control. It can suppress RF leakage interference in a large bandwidth, and meet the high T/R isolation requirements of CW radars.

In order to achieve the above purpose, the technical solution of the proposed invention is as follows:

An optical-electronic integrated RF leakage interference cancellation system for the CW radar consists of a microwave photonic link, a cable link, an electronic coupler and a feedback control unit.

The microwave photonic link comprises an electro-optic modulation unit, an optically enabled microwave phase shift unit, an optically enabled microwave time delay unit, an optically enabled microwave amplitude tuning unit, and a photo detection unit, which are connected in sequence by optical fibers or optical waveguides.

The electro-optic modulation unit and the optically enabled microwave phase shift unit can be the separate units with the function of electro-optic modulation and microwave phase shift individually, or be an integrated unit with the function of electro-optic modulation and microwave phase shift.

The electro-optic modulation unit may be constructed by a direct modulation laser, or by a laser and an electro-optic modulator. The electro-optic modulation unit has the function of modulating the reference signal tapped from the transmitter source of continuous wave on the lightwave generated form the laser. The electro-optic modulation unit outputs the optically carried microwave signal.

The optically enabled microwave phase shift unit has the function of tuning the phase of the optically carried microwave signal from the electro-optic modulation unit, which ensures the out of phase relationship between the cancellation signal and the leakage interference signal at the input ports of the electronic coupler.

The optically enabled microwave time delay unit has the function of tuning the delay time of optically carried microwave signal from the optically enabled microwave phase shift unit.

The optically enabled microwave amplitude tuning unit has the function of adjusting the amplitude of the optically carried microwave signal from the optically enabled microwave time delay unit.

The photo detection unit has the function of the optical-to-electronic conversion for the optically carried microwave signal from the optically enabled microwave amplitude tuning unit and the generation of the cancellation signal.

The cable link connects an electronic circulator and the electronic coupler.

The electronic coupler has two input ports and two output ports. The two input ports are connected with the microwave photonic link and the cable link, respectively. For the two output ports, the one port outputs the residual leakage signal after the cancellation between the microwave photonic link and the cable link, which is input to the feedback control unit; the other port outputs the target signal after the cancellation between the microwave photonic link and the cable link.

The feedback control unit monitors the residual leakage signal from the electronic coupler and then generates the control signal of the phase adjustment, the time delay adjustment and the amplitude adjustment to the optically enabled microwave phase shift unit, the optically enabled microwave time delay unit and the optically enabled microwave amplitude tuning unit respectively, which composes the feedback control loop.

The optical-electronic integrated RF leakage interference cancellation system for CW radars is characterized that the implementation steps to realize the RF leakage interference cancellation are as follows.

The first step, the low power target signal received by the transceiver antenna inputs to the cable link via the electronic circulator. Simultaneously, the high power RF leakage interference signal from the transmitter source of continuous wave via the electronic circulator also inputs to the cable link. The target signal and the RF leakage interference signal transmit through the cable to the input port of the electronic coupler.

The second step, the tapped reference signal from the continuous wave source in the transmitter via the electro-optic modulation unit is modulated on the lightwave form the laser. The optically carried microwave signal transmits through the optically enabled microwave phase shift unit, the optically enabled microwave time delay unit and the optically enabled microwave amplitude tuning unit in sequence. The optically enabled microwave phase shift unit exerts the phase shift to the optically carried microwave signal from the electro-optic modulation unit. The optically enabled microwave time delay unit exerts the time delay to the optically carried microwave signal from the optically enabled microwave phase shift unit. The optically enabled microwave amplitude tuning unit exerts the amplitude adjustment to the optically carried microwave signal from the optically enabled microwave time delay unit. The optically carried microwave signal with the phase shift, time delay and amplitude adjustment feeds to the photo detection unit, where the optical-to-electronic conversion is completed and then the cancellation signal is output.

The third step, the cancellation signal from the optical-to-electronic conversion unit and the leakage interference are combined via the electronic coupler, where the cancellation between the two signals is completed.

The fourth step, the feedback control unit monitors the residual leakage signal from the electronic coupler and generates the control signal via the data processing and algorithm. The control signal adjusts the phase change, time delay change and amplitude change of the optically carried microwave signal in optical domain, and the photo detection unit generates the cancellation signal.

The fifth step, the cancellation signal inputted to the electronic coupler has the following relationship with the leakage interference signal, the out of phase, the same amplitude and the matching time. Then the complete cancellation occurs in the process of circuit closing by the electronic coupler. The RF leakage signal is cancelled, and the target signal received by the transceiver antenna is recovered.

The benefit of the invention:

The microwave photonic link implements the phase adjustment, time delay adjustment and amplitude adjustment of the optically carried microwave signal in optical domain, which has the advantages of broad frequency band, large bandwidth, and high tuning resolution. The target signal received from the transceiver antenna transmits only in the cable link, without additional power attenuation and noise, which is helpful for the recovery of the target signal. Therefore, the optical-electronic integrated RF cancellation system and method by integrating of the microwave photonic link and the cable link can obtain the well matched cancellation conditions between the reference signal and the leakage interference signal. It can realize the effective suppression of the RF leakage interference and ensure the high T/R isolation for the CW radars.

DETAILED DESCRIPTION

Specific embodiments of the invention are further described by combining the drawings and the technical solutions.

The optical-electronic integrated RF leakage interference cancellation system for the CW radar consists of a microwave photonic link, a cable link, an electronic coupler and a feedback control unit.

The microwave photonic link is composed of an electro-optic modulation unit, an optically enabled microwave phase shift unit, an optically enabled microwave time delay unit, an optically enabled microwave amplitude tuning unit, and a photo detection unit, which are connected in sequence by optical fibers or optical waveguides.

The cable link connects an electronic circulator and a cable and an electronic coupler.

The electronic coupler has two input ports and two output ports. The two input ports are connected with the microwave photonic link and the cable link, respectively. For the two output ports, the one port outputs the residual leakage signal after the cancellation between the microwave photonic link and the cable link, which is input to the feedback control unit; the other port outputs the target signal after the cancellation between the microwave photonic link and the cable link.

The feedback control unit monitors the residual leakage signal from the electronic coupler and then generates the control signal of the phase adjustment, the time delay adjustment and the amplitude adjustment to the optically enabled microwave phase shift unit, the optically enabled microwave time delay unit and the optically enabled microwave amplitude tuning unit respectively, which composes the feedback control loop.

Embodiment

Figure 1:
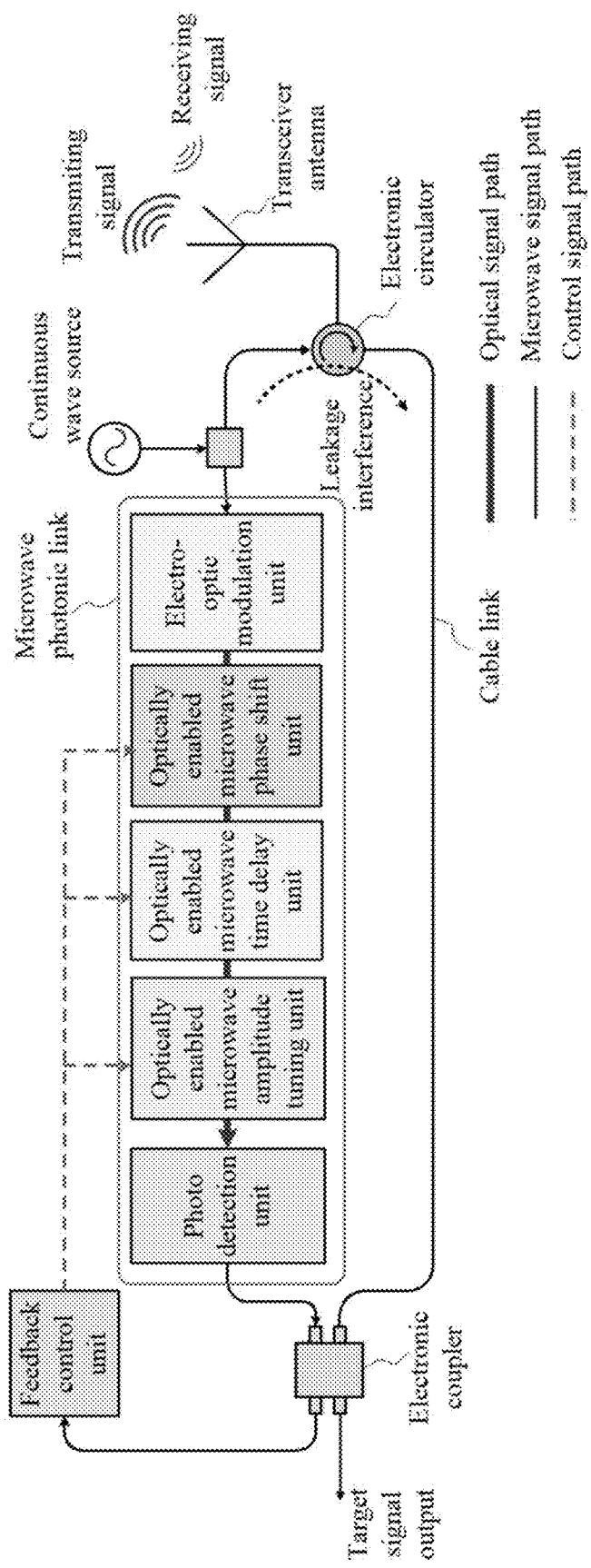
FIG. 1 is the structure diagram of the optical-electronic integrated RF leakage interference cancellation system.

FIG. 1 is the structure diagram of the optical-electronic integrated RF leakage interference cancellation system. The low power target signal received by the transceiver antenna inputs to the cable link via the electronic circulator. Simultaneously, the high power RF leakage interference signal from the transmitter source of continuous wave via the electronic circulator also inputs to the cable link. The target signal and the RF leakage interference signal transmit through the cable to the input port of the electronic coupler.

Figure 2:
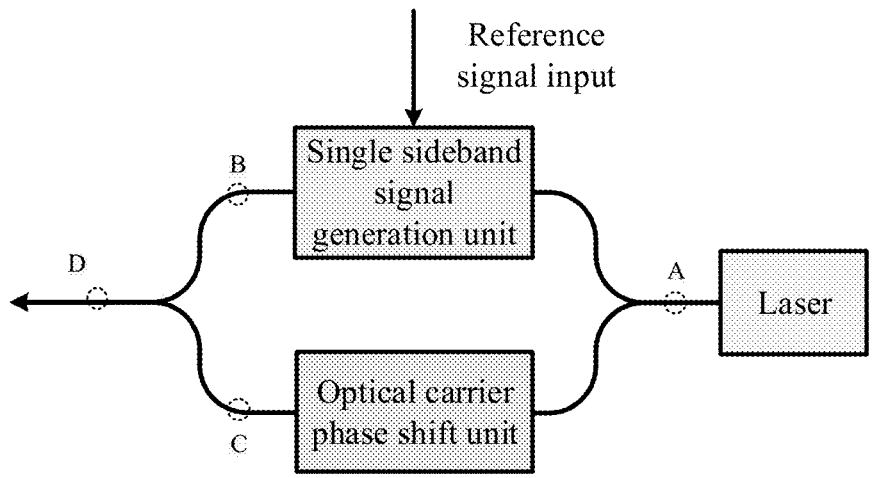
FIG. 2 is the structure diagram of the function integrated unit for the electro-optic modulation and the optically enabled microwave phase shift in the embodiment of the invention.
Figure 3:
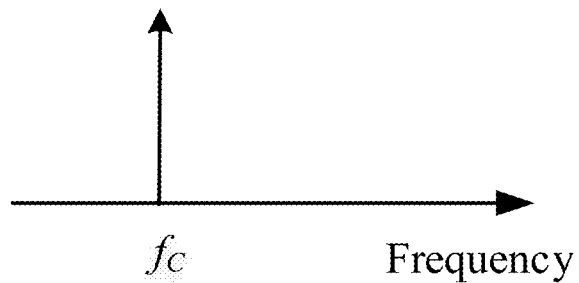
FIG. 3 is the output spectrum diagram at Point A in the function integrated unit for the electro-optic modulation and the optically enabled microwave phase shifting in the embodiment of the invention.
Figure 4:
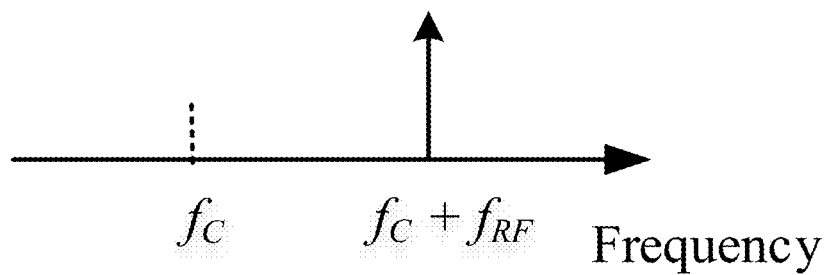
FIG. 4 is the output spectrum diagram at Point B in the function integrated unit for the electro-optic modulation and the optically enabled microwave phase shift in the embodiment of the invention.
Figure 5:
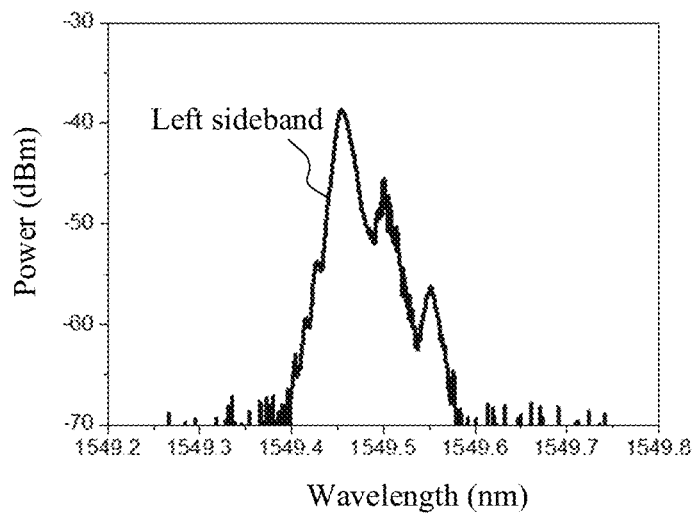
FIG. 5 the measured spectrum diagram at Point B in the function integrated unit for the electro-optic modulation and the optically enabled microwave phase shift in the embodiment of the invention
Figure 6:
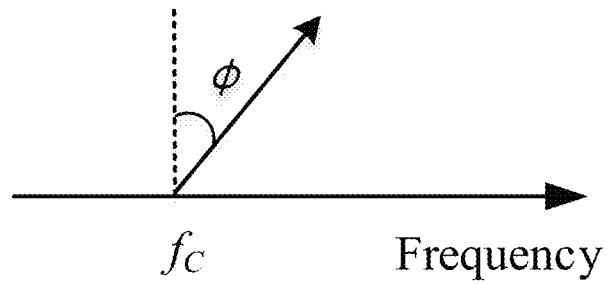
FIG. 6 is the output spectrum diagram at Point C in the function integrated unit for the electro-optic modulation and the optically enabled microwave phase shift in the embodiment of the invention.
Figure 7:
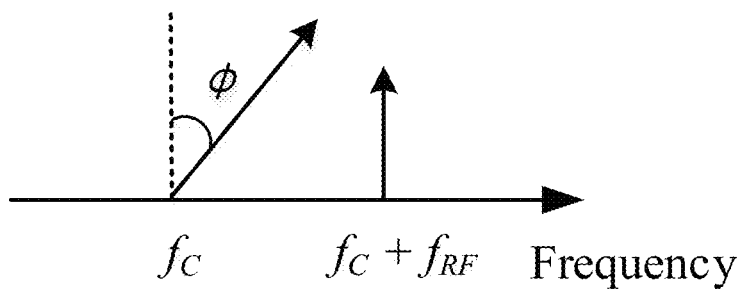
FIG. 7 is the output spectrum diagram at Point D in the function integrated unit for the electro-optic modulation and the optically enabled microwave phase shift in the embodiment of the invention.

The tapped reference signal from the continuous wave source in the transmitter is input to the function integrated unit for the electro-optic modulation and the optically enabled microwave phase shifting. As shown in FIG. 2, the function integrated unit for the electro-optic modulation and the optically enabled microwave phase shift consists of a laser, a unit for the generation of signal sideband and a unit for phase shifting of optical carrier. The frequency of the optical carrier from the laser is $f_c$ with the wavelength of 1549.5 nm, and the spectrum diagram is shown in FIG. 3. The optical carrier is split into two paths, one is input to the unit for the generation of signal sideband, and the other is input to the unit for phase shifting of optical carrier. The reference signal tapped from the CW signal source in the transmitter with the frequency of 14 GHz is input to the unit for the generation of signal sideband, is modulated on the optical carrier from the laser. The single sideband carrier-suppressed signal with the schematic spectrum diagram shown as FIG. 4 is generated and the measured spectrum is shown in FIG. 5. From FIG. 5 it can be seen that the optical carrier and the right sideband is suppressed, and the single left sideband signal is obtained by the unit for the generation of signal sideband. The added phase of $\varphi$ is applied to the optical carrier by the unit for phase shifting of optical carrier, and the schematic diagram of output spectrum is shown in FIG. 6. The single sideband signal and the phase shifted optical carrier are combined with the schematic diagram of output spectrum shown in FIG. 7. By adjusting the added phase of optical carrier, the different phase shift of the microwave can be obtained, for example $\varphi=180°$.

The optically enabled microwave time delay unit applies the time delay tuning on the optically carried microwave signal from the function integrated unit for the electro-optic modulation and the optically enabled microwave phase shifting. The optically enabled microwave amplitude tuning unit exerts the amplitude adjustment to the optically carried microwave signal from the optically enabled microwave time delay unit.

The optically carried microwave signal with the phase shift, time delay and amplitude adjustment feeds to the photo detection unit, where the optical-to-electronic conversion is completed and then the cancellation signal is output. The cancellation signal from the optical-to-electronic conversion unit and the leakage interference are combined via the electronic coupler. When the phase shift is $\varphi=180°$, the phase of the cancellation signal and the leakage interference is opposite, and the cancellation occurs in the process of combining.

The feedback control unit monitors the residual leakage signal from the electronic coupler and generates the control signal via the data processing and algorithm. The control signal adjusts the phase change, time delay change and amplitude change of the optically carried microwave signal in optical domain, and the photo detection unit generates the cancellation signal with the following relationship versus the leakage interference signal, the out of phase, the same amplitude and the matching time.

The cancellation signal and the leakage interference signal into the electronic coupler with the conditions of the out of phase, the same amplitude and the matching time cancel with each other completely in the process of combining by the electronic coupler. The RF leakage signal is cancelled, and the target signal received by the transceiver antenna is recovered.

The above contents are the further detailed description of the invention. The embodiments of the invention are not limited to the description. For those persons in the related technical field, it is possible to make some derivations and substitutions without departing from the spirit and scope of the invention. The derivations and substitutions should also be regarded as the protection scope of the invention.

The invention claimed is:

1. An optical-electronic integrated radio frequency (RF) leakage interference cancellation system for the continuous wave (CW) radar, wherein comprising a microwave photonic link, a cable link, an electronic coupler and a feedback control unit;

the microwave photonic link comprises an electro-optic modulation unit, an optically enabled microwave phase shift unit, an optically enabled microwave time delay unit, an optically enabled microwave amplitude tuning unit, and a photo detection unit, which are connected in sequence by optical fibers or optical waveguides;

the electro-optic modulation unit is constructed by a direct modulation laser, or by a laser and an electro-optic modulator; the electro-optic modulation unit has the function of modulating the reference signal tapped from the transmitter source of continuous wave on the lightwave generated form the laser; the electro-optic modulation unit outputs the optically carried microwave signal;

the optically enabled microwave phase shift unit has the function of tuning the phase of the optically carried microwave signal from the electro-optic modulation unit, which ensures the out of phase relationship between the cancellation signal and the leakage interference signal at the input ports of the electronic coupler;

the optically enabled microwave time delay unit has the function of tuning the delay time of optically carried microwave signal from the optically enabled microwave phase shift unit;

the optically enabled microwave amplitude tuning unit has the function of adjusting the amplitude of the optically carried microwave signal from the optically enabled microwave time delay unit;

the photo detection unit has the function of the optical-to-electronic conversion for the optically carried microwave signal from the optically enabled microwave amplitude tuning unit and the generation of the cancellation signal;

the cable link connects an electronic circulator and the electronic coupler;

the electronic coupler has two input ports and two output ports; the two input ports are connected with the microwave photonic link and the cable link, respectively; for the two output ports, the one port outputs the residual leakage signal after the cancellation between the microwave photonic link and the cable link, which is input to the feedback control unit; the other port outputs the target signal after the cancellation between the microwave photonic link and the cable link;

the feedback control unit monitors the residual leakage signal from the electronic coupler and then generates the control signal of the phase adjustment, the time delay adjustment and the amplitude adjustment to the optically enabled microwave phase shift unit, the optically enabled microwave time delay unit and the optically enabled microwave amplitude tuning unit respectively, which composes the feedback control loop.

2. The optical-electronic integrated RF leakage interference cancellation system for the CW radar according to claim 1, wherein the electro-optic modulation unit and the optically enabled microwave phase shift unit can be the separate units with the function of electro-optic modulation and microwave phase shift individually, or be an integrated unit with the function of electro-optic modulation and microwave phase shift.

3. A RF leakage interference cancellation method using the optical-electronic integrated RF leakage interference cancellation system for CW radar of claim 1, wherein comprising the following steps:

the first step, the low power target signal received by the transceiver antenna inputs to the cable link via the electronic circulator; the high power RF leakage interference signal from the transmitter source of continuous wave via the electronic circulator also inputs to the cable link; the target signal and the RF leakage interference signal transmit through the cable to the input port of the electronic coupler;

the second step, the tapped reference signal from the continuous wave source in the transmitter via the electro-optic modulation unit is modulated on the lightwave form the laser; the optically carried microwave signal transmits through the optically enabled microwave phase shift unit, the optically enabled microwave time delay unit and the optically enabled microwave amplitude tuning unit in sequence; the optically enabled microwave phase shift unit exerts the phase shift to the optically carried microwave signal from the electro-optic modulation unit; the optically enabled microwave time delay unit exerts the time delay to the optically carried microwave signal from the optically enabled microwave phase shift unit; the optically enabled microwave amplitude tuning unit exerts the amplitude adjustment to the optically carried microwave signal from the optically enabled microwave time delay unit; the optically carried microwave signal with the phase shift, time delay and amplitude adjustment feeds to the photo detection unit, where the optical-to-electronic conversion is completed and then the cancellation signal is output;

the third step, the cancellation signal from the optical-to-electronic conversion unit and the leakage interference are combined via the electronic coupler, where the cancellation between the two signals is completed;

the fourth step, the feedback control unit monitors the residual leakage signal from the electronic coupler and generates the control signal via the data processing and algorithm; the control signal adjusts the phase change, time delay change and amplitude change of the optically carried microwave signal in optical domain, and the photo detection unit generates the cancellation signal;

the fifth step, the cancellation signal inputted to the electronic coupler has the following relationship with the leakage interference signal, the out of phase, the same amplitude and the matching time; then the complete cancellation occurs in the process of circuit closing by the electronic coupler; the RF leakage signal is cancelled, and the target signal received by the transceiver antenna is recovered.

* * * * *